UNITED STATES PATENT OFFICE.

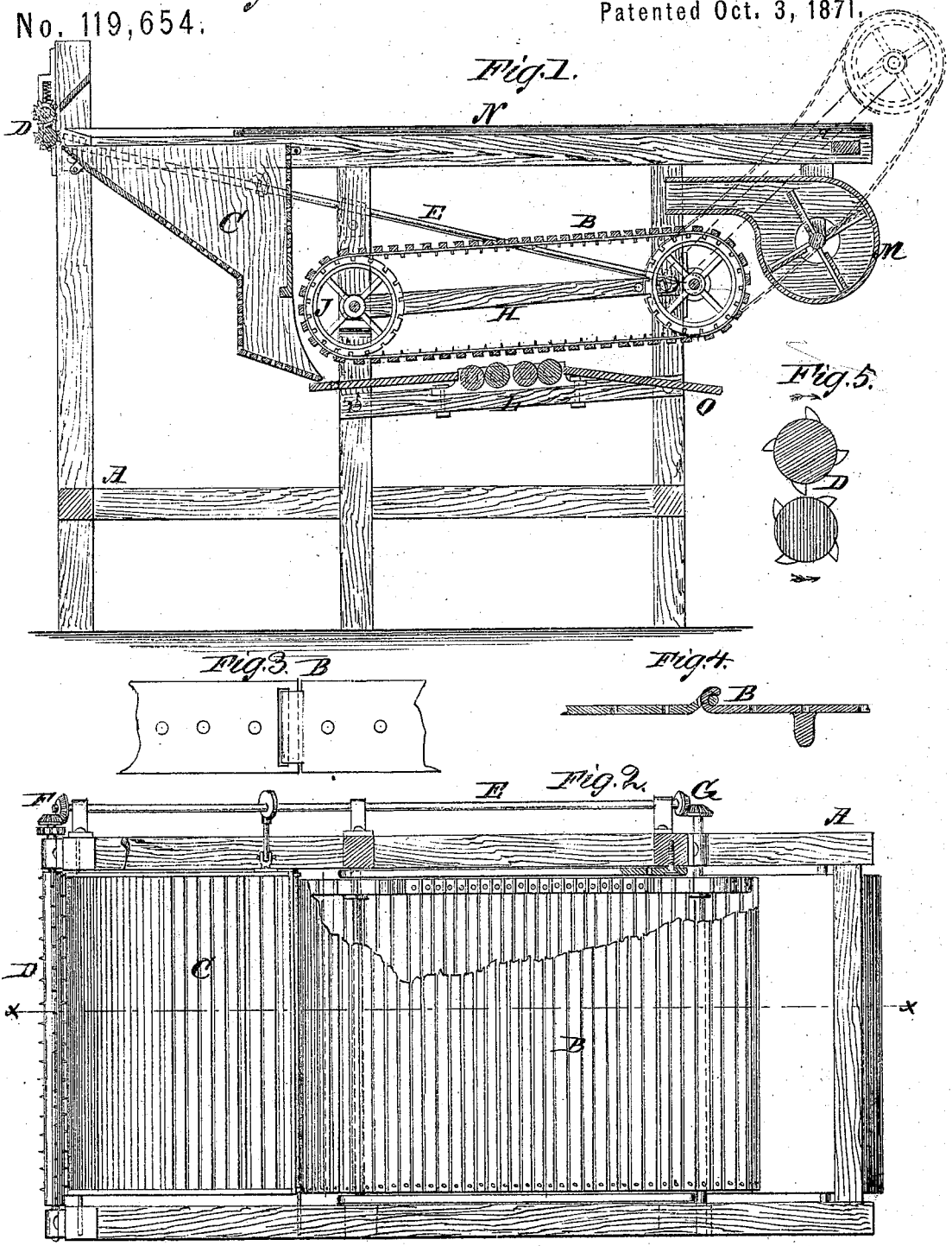

DANIEL SAGER, OF NEW YORK CITY, ASSIGNOR TO JAMES A. ROBINSON, OF BROOKLYN, NEW YORK.

IMPROVEMENT IN CORN-HUSKERS.

Specification forming part of Letters Patent No. 119,654, dated October 3, 1871.

*To all whom it may concern:*

Be it known that I, DANIEL SAGER, of the city, county, and State of New York, have invented a new and useful Improvement in Corn-Husker; and I do hereby declare that the following is a full, clear, and exact description thereof, which will enable others skilled in the art to make and use the same, reference being had to the accompanying drawing forming part of this specification.

This invention relates to new and useful improvements in a corn-husker, some of the main features of which are already secured to me by Letters Patent; and consists in additions, modifications, and alterations in the said patented machine, hereinafter described.

In the accompanying drawing, Figure 1 represents a vertical longitudinal section of the machine taken in the line $x$ $x$ of Fig. 2. Fig. 2 is a top or plan view. Figs. 3 and 4 are details, showing the mode of forming the links of the chain of the endless revolving apron. Fig. 5 is a detail of the pickers, showing a cross-section.

Similar letters of reference indicate corresponding parts.

A is the frame; B, the endless revolving apron; C, the shaker; D, the pickers. The motive power is applied to the pickers, which pickers are geared together and revolve with a uniform motion. E is a rod or shaft which is revolved from the picker by means of bevel-gear wheels, as seen at F. The apron is driven by means of this shaft, as seen at G. H is a bar on each side, which is attached to the frame at I. The chain-wheel J revolves on journals supported by these bars. By means of holes in these bars the chain-apron may be stretched and the proper tension maintained. The forward ends of the apron are loose, so that its weight rests on the ears of corn as the latter pass to the rollers L. It will be noticed that these rollers L are placed inclined toward the front of the machine. The apron, being suspended from the point I, may be turned up, as seen in dotted lines in Fig. 1, to give ready access to the rollers L for the purpose of packing or adjusting them or for other purposes. The shaker C is made of slats—or open—so that small husks, dirt, or other foreign matter may escape and not be carried on to the rollers L. To facilitate the removal of such particles of matter and to allow the ears of corn to be delivered from the machine clear of dust and other matter, I place a fan-blower, M, in some convenient position and convey a blast or current of air upon the corn. I do not confine myself to any particular mode of driving or applying the blower. By this arrangement the operation of the machine is greatly improved. The apron is driven by positive motion, and slipping of the same on its wheels is entirely prevented by the improved links shown in Figs. 3 and 4. The advantage of throwing the apron back out of the way, as seen in dotted lines, is a very important feature. N is the table from which the corn (still on the stalk) is fed into the pickers.

The stalk is drawn through between the picker, leaving the ears of corn with the husks thereon to drop back into the shaker C and descend over the grating to its bottom, where the ears come in contact with the revolving apron and are carried back over the rollers L and are discharged from the stationary apron O entirely divested of husks and ready for the bin.

With this machine the tedious operation of picking corn from the stalks and husking it by hand is done by horse-power and in the most perfect and expeditious manner.

Having thus described my invention, I claim as new and desire to secure by Letters Patent—

1. The endless apron B and shaker C, combined with a common revolving shaft, E, for the purpose of making their relative movements always correspondent to one another.

2. The shaker C, having its sides $a$ $b$ $c$ slatted, as and for the purpose specified.

3. The arrangement of the slatted shaker C and the fan-blower M, as shown and described, for the purpose set forth.

The above specification of my invention signed by me this 29th day of December, 1870.

DANIEL SAGER.

Witnesses:
GEO. W. MABEE.
ALEX. F. ROBERTS.